United States Patent
Bell et al.

(10) Patent No.: US 9,212,925 B2
(45) Date of Patent: Dec. 15, 2015

(54) TRAVEL DEPARTURE TIME DETERMINATION USING SOCIAL MEDIA AND REGIONAL EVENT INFORMATION

(71) Applicant: International Business Machines Corporation, Armonk, NY (US)

(72) Inventors: Denise A. Bell, Austin, TX (US); Pamela F. Geiger, Apex, NC (US); Leah A. Lawrence, Austin, TX (US); Irgelkha D. Mejia, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 13/908,756

(22) Filed: Jun. 3, 2013

(65) Prior Publication Data

US 2014/0358435 A1 Dec. 4, 2014

(51) Int. Cl.
- *G01C 21/34* (2006.01)
- *H04W 4/02* (2009.01)
- *G08G 1/0967* (2006.01)

(52) U.S. Cl.
CPC ...... *G01C 21/3492* (2013.01); *G08G 1/096716* (2013.01); *G08G 1/096741* (2013.01); *G08G 1/096775* (2013.01); *H04W 4/028* (2013.01)

(58) Field of Classification Search
CPC ..................... G01C 21/3492; G01C 1/096775; G01C 1/096741; G01C 1/096716; H04W 4/028
USPC .................................................. 701/400, 527
See application file for complete search history.

(56) References Cited

U.S. PATENT DOCUMENTS

| | | | |
|---|---|---|---|
| 7,877,280 B2 | 1/2011 | Jones et al. | |
| 8,090,530 B2 | 1/2012 | Horvitz | |
| 2005/0099323 A1 | 5/2005 | Hirose | |
| 2006/0161334 A1 | 7/2006 | Teramae | |
| 2009/0299629 A1 | 12/2009 | Grigsby et al. | |
| 2010/0268456 A1 | 10/2010 | Kantarjiev et al. | |
| 2011/0043377 A1 | 2/2011 | McGrath et al. | |
| 2012/0290950 A1* | 11/2012 | Rapaport et al. | 715/753 |
| 2013/0024060 A1* | 1/2013 | Sukkari et al. | 701/22 |
| 2013/0079964 A1* | 3/2013 | Sukkari et al. | 701/22 |
| 2013/0117057 A1* | 5/2013 | Van Moltke et al. | 705/7.13 |

FOREIGN PATENT DOCUMENTS

WO 2007042796 A1 4/2007

OTHER PUBLICATIONS

Jonathan Doyle, Will In-Car Social Media Kill the Traffic Jam?, Online Article: Popular Mechanics, Jan. 4, 2011, Hearst Communication, Inc., Published online at: http://www.popularmechanics.com/cars/news/industry/will-in-car-social-media-kill-the-traffic-jam?click=main_sr.

* cited by examiner

*Primary Examiner* — Russell Frejd
(74) *Attorney, Agent, or Firm* — Lee Law, PLLC; Christopher B. Lee (57) ABSTRACT

A request is received from a route traveler for a suggested departure time associated with travel to a destination. Community event and social media information, related to events and activities near a travel route to the destination, is evaluated. The suggested departure time is determined based upon the community event and social media information related to the events and activities near the travel route to the destination. The suggested departure time determined based upon the community event and social media information related to the events and activities near the travel route to the destination is provided.

17 Claims, 4 Drawing Sheets

TRAVEL DEPARTURE TIME DETERMINATION USING SOCIAL MEDIA AND REGIONAL EVENT INFORMATION

BACKGROUND

The present invention relates to travel departure planning. More particularly, the present invention relates to travel departure time determination using social media and regional event information.

Web-based mapping services allow users to enter a destination location and a departure location, such as by entry of addresses of the respective locations. These web-based mapping services provide maps and/or directions based upon the entered destination and departure locations.

BRIEF SUMMARY

A method includes receiving, at a processor, a request from a route traveler for a suggested departure time associated with travel to a destination; evaluating community event and social media information related to events and activities near a travel route to the destination; determining the suggested departure time based upon the community event and social media information related to the events and activities near the travel route to the destination; and providing the suggested departure time determined based upon the community event and social media information related to the events and activities near the travel route to the destination.

A system includes a memory, and a processor programmed to: receive a request from a route traveler for a suggested departure time associated with travel to a destination; evaluate community event and social media information obtained from the memory related to events and activities near a travel route to the destination; determine the suggested departure time based upon the community event and social media information related to the events and activities near the travel route to the destination; and provide the suggested departure time determined based upon the community event and social media information related to the events and activities near the travel route to the destination.

A computer program product includes a computer readable storage medium having computer readable program code embodied therewith, where the computer readable program code when executed on a computer causes the computer to: receive a request from a route traveler for a suggested departure time associated with travel to a destination; evaluate community event and social media information related to events and activities near a travel route to the destination; determine the suggested departure time based upon the community event and social media information related to the events and activities near the travel route to the destination; and provide the suggested departure time determined based upon the community event and social media information related to the events and activities near the travel route to the destination.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides travel departure time determination using social media and regional event information. Using the technology described herein, users may provide information regarding intended departure and destination locations, and intended/planned arrival times. This information, and similar information, provided by multiple users may be aggregated and evaluated in combination with overall traffic information, social media feedback regarding traffic, and regional event information gathered from a variety of sources. The gathered information may be scoped based upon a geographical region of traffic influence determined for each user based upon their respective departure and destination information, route, and intended/planned arrival times. The geographical region of traffic influence may be increased as travel distances increase because more events that are near the travel route may influence traffic along the travel route. The event information may include information related to community activities and locations, such as sporting stadiums/events/games, concert venues/concerts, restaurant density per geographic area, and other community event-related/activity-related information. An individualized travel time and an individualized departure time may be determined/calculated for each user based upon these several aggregated factors and each user's respective intended arrival time within their respective geographic region of influence.

The individualized determined departure time may take into account how many users are requesting travel departure information, and the respective departure times may be prioritized based upon the respective intended arrival times and the gathered information. For example, an overall activity of traffic and events that may impact the density of traffic in a region near the travel routes may be calculated. The suggested departure times for multiple users may be adjusted to suggest users with a shorter travel time/distance to leave earlier than users that have a longer travel time/distance, and the respective departure times may be provided to the users. As such, shorter-distance travel requests may be prioritized with earlier suggested departure times so that the shorter-distance travels may be completed prior to traffic congestion being compounded by longer-distance travels along similar routes and within similar traffic regions. Accordingly, traffic congestion may be decreased across the set of aggregated travel requests.

The users may optionally receive a reminder for their respective departure times and/or alerts for any changes to their respective departure times. Continuous re-evaluation of the suggested departure times based on departure and arrival times of other users, inputs from social media (social comment posting systems, event notifications or updates, other phone and event applications), changing traffic conditions, changing weather conditions, and other factors may be performed. The reminders may be updated in response to such changes that affect traffic conditions as determined through any of the respective information sources. As such, users may receive alerts regarding initial proposed departure times and may receive alerts regarding changes to the proposed departure times.

Users that have subscribed to this service may be tracked to determine whether they have adhered to the suggested departure time or whether they have departed at a different time. Subscribing users may also check in upon arrival at their destination to provide feedback usable for any outstanding or new departure time requests.

Because deviations from suggested departure times may impact the proposed departure times provided to other users, the suggested departure times may be continuously re-evaluated and updated based upon such deviations. The suggested departure times may also be continuously re-evaluated and updated based upon changes to the gathered traffic information, social media feedback regarding traffic, and regional event information.

As one possible example use case, a user may request a departure time to travel to and attend a concert at a local concert venue. The user may be provided with a travel route based upon the time of day, event schedule, social media information related to comments from other concert goers about when they plan to travel to the concert, and news sources regarding traffic congestion that results from the influx of travelers to the concert venue. Further, these information sources may be continuously monitored to determine whether, for example, a vehicle collision has occurred that temporarily increases travel congestion, and the suggested departure times may be updated accordingly. Additionally, if it is determined that a sports venue has a sporting event that is close in time to the concert, information related to that sporting event may be utilized to determine/adjust the suggested departure times.

Dynamic selection of social media and local event information sources to parse for scheduling and traffic implications based upon changes to local the events (e.g., scheduled start and end times, sporting event in overtime, traffic collisions, etc.), provides a flexible and changing set of information resource utilization. As such, if any of the above or other information changes, such as the sporting event going into overtime, the suggested departures times may be changed based upon such real-world traffic-impacting dynamics, and notifications to users of new/updated (e.g., earlier or later) suggested departure times may be generated.

The dynamic selection of social media and local event information sources may further be refined by consideration of the distance associated with each departure time request. As such, the dynamic selection of social media and local event information sources may be granularly applied to each request or to sets of requests as appropriate for a given implementation. For example, if a requesting user has a particular distance to travel, a region of traffic influence may be identified that is determined to impact or potentially impact traffic along and/or peripheral to the travel route based upon the determined distance. The region of traffic influence may be based upon roadway intersections and types of intersections, urban versus rural traffic locations, and other factors that may affect vehicle density within an area surrounding or peripheral to the travel route. The region of traffic influence may be of any resulting shape based upon the variety of factors utilized to determine the region of traffic influence, and may be determined as a single geographic circular region, as a series of circular or other-shaped regions interconnected or interspersed along the travel route (e.g., with each region originating from an intersection along the travel route), or other shape(s) as appropriate for the particular roadways/travel ways along the travel route. As one example, the region of traffic influence may be considered a geographic circular region of traffic influence with a circumference bounded by a radius equivalent to the determined distance along the travel route to the destination, where the center of the circular region is oriented at the destination and the radius emanates from the destination. Based upon this model, larger travel distances may be configured with larger regions of traffic influence. Within this framework, the region of traffic influence determined to impact or potentially impact traffic along and/or peripheral to the travel route may increase proportionally to increases in the determined distance along the travel route to the destination.

As another example, a dynamically-shaped and granular region of traffic influence may be identified for each departure time request based upon particular regional events that may impact traffic conditions at different points along the travel route. A set of sub-regions of traffic influence may be identified along the travel route, and the set of sub-regions of traffic influence may be linked together to form a union of the respective sub-regions of traffic influence. The identified region of traffic influence may further be refined and dynamically adjusted to any shape along the travel route by identifying a set of geographic regions (e.g., circular regions) of traffic influence. Each geographic region of traffic influence may emanate from an intersection along the travel route to the destination. Further, each of the set of geographic regions of traffic influence may include a circumference bounded by a radius equivalent to a distance from the respective intersection to a subsequent intersection along the travel route to the destination. Many other possibilities exist for identification of an aggregated/combined set of sub-regions of traffic influence and all such possibilities are considered within the scope of the present technology.

As such, the suggested/recommended departures times may be updated/re-assessed for each first user based on one or more prioritized considerations selected from a group consisting of other users' traveling times, traffic conditions at different points along the travel route (e.g., intersections and events that impact each intersection), the number of people traveling on the expected route of a first user towards a first destination, an event start time, feedback from social media, feedback from GPS services, overall expected traffic activity affecting the density of traffic, weather conditions, accidents, emergency vehicles, and other requested arrivals.

To further elaborate, the present technology provides a recommended departure times for subscribed users. Initially the users may provide information regarding the desired destination and preferred arrival time. Based on information provided by multiple users, along with other data sources as described above, the respective travel times may be calculated and provided to the respective users along with a recommended departure time that is based upon each user's requested arrival time and the impact of all available information for the travel route. As an iterative methodology, actual arrival times may be captured and combined with new updates to predict the actual arrival time of other users and to update any previous departure time recommendations as appropriate. As such, the present technology provides a departure time feedback loop.

The departure time feedback loop may be considered an interactive or "negotiation" departure feedback loop that identifies when people leave and arrive and feeds that information back in to reevaluate a set of suggested departure times. Tracking of actual trips and travel completions may be performed through global positioning system (GPS) or social media "check-in" type technologies (where users may let friends know when they arrive). Actual versus target arrivals may be tracked, and suggested departure times may be adjusted as appropriate for a given implementation.

The tracking may further include listeners that have been identified for social media websites. Tracking may be performed using really simple syndication (RSS) feeds or other data/information feeds based upon tags. Many tag configurations are possible and all such possibilities are considered within the scope of the present technology.

In response to a user providing a destination and a distance, a set of tags may be identified associated with such information feed sources based upon weather conditions, traffic conditions, event times, and other information available from the information feed sources that provide information based upon the set of tags. As such, specific sources of information may be identified for each specific destination within a specific radius relative to the destination that may impact traffic along the travel route. This dynamic selection of local events to parse for scheduling and traffic implications and specific tags may be analyzed as appropriate for the particular travel routes.

The present technology may further be provided as a web-based or mobile-based application (that may be subscribed to or purchased), or may be GPS-based as a client deployment platform. The respective application may connect to Internet and read/obtain the respective information types of feeds based upon the identified tags.

To further detail the calculations performed in response to user input of the desired arrival time and destination, additional aspects of travel-affecting information may be analyzed in order to calculate the suggested departure time for each user, as appropriate for a given implementation. For example, traffic conditions, a number of other users currently indicating an intent to begin travel to or near the user's destination, popular event start times, feedback available from social media services and global positioning system (GPS) services, news sources, and other information sources, may be analyzed and a suggested departure time calculated for the user.

It should be noted that conception of the present subject matter resulted from recognition of certain limitations associated with travel planning systems. For example, it was observed that, while conventional travel planning systems may provide maps, these maps are often out of date and do not consider current traffic and weather conditions. It was further observed that if many users of these conventional travel planning systems depart for a destination at approximately the same time, the simultaneous departures may create or add to existing traffic congestion. It was determined, based upon these observations, that a user of conventional travel planning systems cannot estimate travel time with certainty as a result of dynamic changes that occur with high-density traffic. Additionally, due to the spontaneous nature of traffic conditions that occur based upon local events (e.g., vehicle wrecks, sporting events, concerts, etc.), it was determined that it is difficult to estimate when users should attempt to depart for a destination based upon conventional systems. The present subject matter improves travel departure planning by providing for travel departure time determination using social media and regional event information, as described above and in more detail below. As such, improved travel departure planning may be obtained through use of the present technology.

The travel departure time determination using social media and regional event information described herein may be performed in real time to allow prompt adjustment of departure times using information from a variety of sources. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
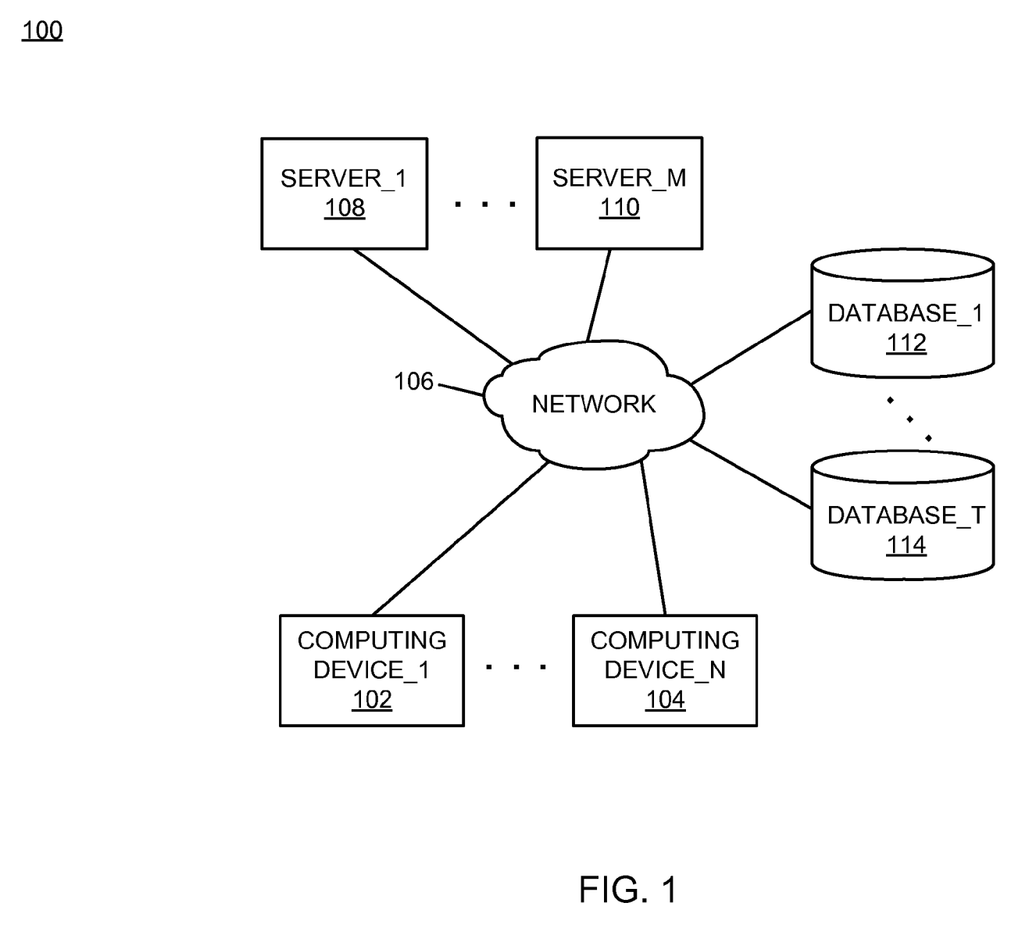
FIG. 1 is a block diagram of an example of an implementation of a system for travel departure time determination using social media and regional event information according to an embodiment of the present subject matter.

FIG. 1 is a block diagram of an example of an implementation of a system 100 for travel departure time determination using social media and regional event information. A computing device_1 102 through a computing device_N 104 communicate via a network 106 with several other devices. The other devices include a server_1 108 through a server_M 110. The computing device_1 102 through the computing device_N 104 and the server_1 108 through the server_M 110 may also communicate with one or more of a database_1 112 through a database_T 114 to store and retrieve information.

As will be described in more detail below in association with FIG. 2 through FIG. 4, any of the computing device_1 102 through the computing device_N 104 and the server_1 108 through the server_M 110 may, either alone or in combination, provide automated travel departure time determination using social media and regional event information, as appropriate for a given implementation. As such, the present technology may be implemented at a user computing device level or a server device level.

The automated travel departure time determination using social media and regional event information is based upon analysis of multiple departure time requests and informational inputs from multiple sources, as described above and in more detail below. The automated travel departure time determination using social media and regional event information is further based upon distribution of suggested departures times for the requesting individuals based upon the distribution of clustered requests, social media feedback, roadway traffic and weather conditions, regional events (e.g., sports start and end times, overtime indications obtained via news and social media, etc.), and other information. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104 or another one of the server_1 108 through the server_M 110, via a network, such as the network 106. As such, the server_1 108 through the server_M 110 may each include a web server, application server, or other data server device. Further, the server_1 108 through the server_M 110 may represent social media servers, weather information servers, traffic information servers, current event information servers (e.g., sporting or concert event schedules, etc.), global positioning system (GPS) satellites and/or servers, or other information providers, as appropriate for a given implementation.

The database_1 112 through the database_T 114 may include relational databases, object databases, or any other storage type of device. As such, the database_1 112 through the database_T 114 may be implemented as appropriate for a given implementation. Further, the database_1 112 through the database_T 114 may include social media databases, weather information databases, traffic information databases, roadway mapping and construction information databases, current event information databases, GPS mapping information databases, or other information databases, as appropriate for a given implementation. The respective databases may be utilized by companion server devices, such as one or more of the server_1 108 through the server_M 110 to perform the respective tasks as described above and in more detail below.

Figure 2:
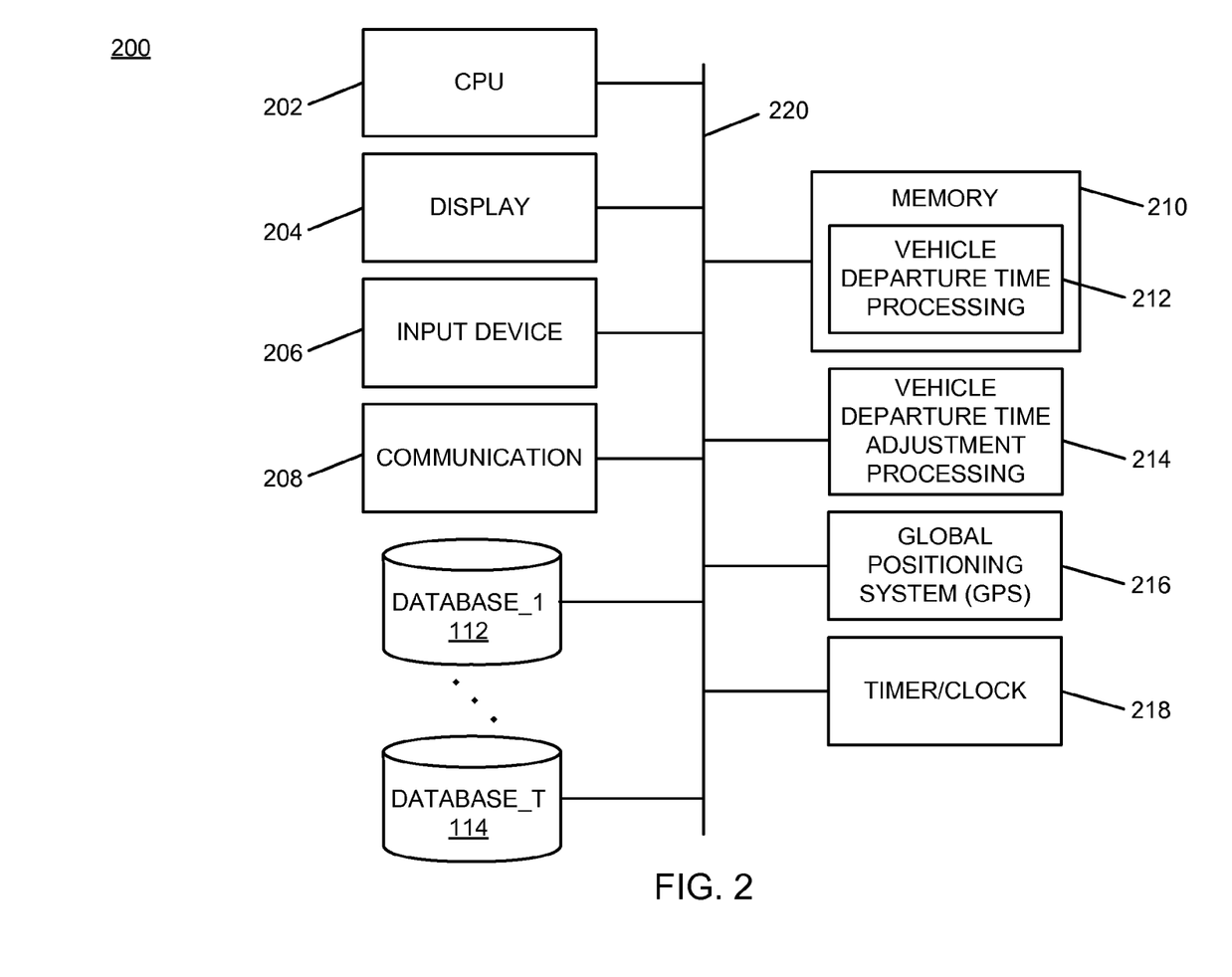
FIG. 2 is a block diagram of an example of an implementation of a core processing module capable of performing travel departure time determination using social media and regional event information according to an embodiment of the present subject matter.

FIG. 2 is a block diagram of an example of an implementation of a core processing module 200 capable of performing travel departure time determination using social media and regional event information. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of information for vehicle departure time adjustment in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a vehicle departure time processing storage area 212 that stores obtained information and results related to vehicle departure times processed by the core processing module 200. As will be described in more detail below, obtained information and results stored within the vehicle departure time processing storage area 212 is used to calculate and adjust vehicle departure times using social media and regional event information.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A vehicle departure time adjustment processing module 214 is also illustrated. The vehicle departure time adjustment processing module 214 provides calculation and adjustment processing activities related to vehicle departure times for the core processing module 200, as described above and in more detail below. The vehicle departure time adjustment processing module 214 implements the automated travel departure time determination using social media and regional event information of the core processing module 200.

It should also be noted that the vehicle departure time adjustment processing module 214 may form a portion of other circuitry described without departure from the scope of the present subject matter. Further, the vehicle departure time adjustment processing module 214 may alternatively be implemented as an application stored within the memory 210. In such an implementation, the vehicle departure time adjustment processing module 214 may include instructions executed by the CPU 202 for performing the functionality described herein. The CPU 202 may execute these instructions to provide the processing capabilities described above and in more detail below for the core processing module 200. The vehicle departure time adjustment processing module 214 may form a portion of an interrupt service routine (ISR), a portion of an operating system, a portion of a browser application, or a portion of a separate application without departure from the scope of the present subject matter.

A global positioning system (GPS) module 216 provides positioning location coordinates usable for identifying current roadway, weather, event, or other information relative to departure and/or destination locations. The GPS module 216 may also be used to identify a physical and/or logical location for departure and/or destination locations. Location identification information generated by the GPS module 216 may be stored within the vehicle departure time processing storage area 212 for use by the vehicle departure time adjustment processing module 214.

A timer/clock module 218 is illustrated and used to determine timing and date information, such as suggested departure times and adjusted departure times, as described above and in more detail below. As such, the vehicle departure time adjustment processing module 214 may utilize information derived from the timer/clock module 218 for information processing activities, such as the travel departure time determination using social media and regional event information.

The database_1 112 through the database_T 114 are also shown associated with the core processing module 200 within FIG. 2 to show that the database_1 112 through the database_T 114 may be operatively coupled to the core processing module 200 without requiring external connectivity, such as via the network 106.

The CPU 202, the display 204, the input device 206, the communication module 208, the memory 210, the vehicle departure time adjustment processing module 214, the GPS module 216, the timer/clock module 218, and the database_1 112 through the database_T 114 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database_1 112 through the database_T 114 are illustrated as separate components for purposes of example, the information stored within the database_1 112 through the database_T 114 may also/alternatively be stored within the memory 210 without departure from the scope of the present subject matter. Accordingly, the core processing module 200 may take many forms and may be associated with many platforms.

Figure 3:
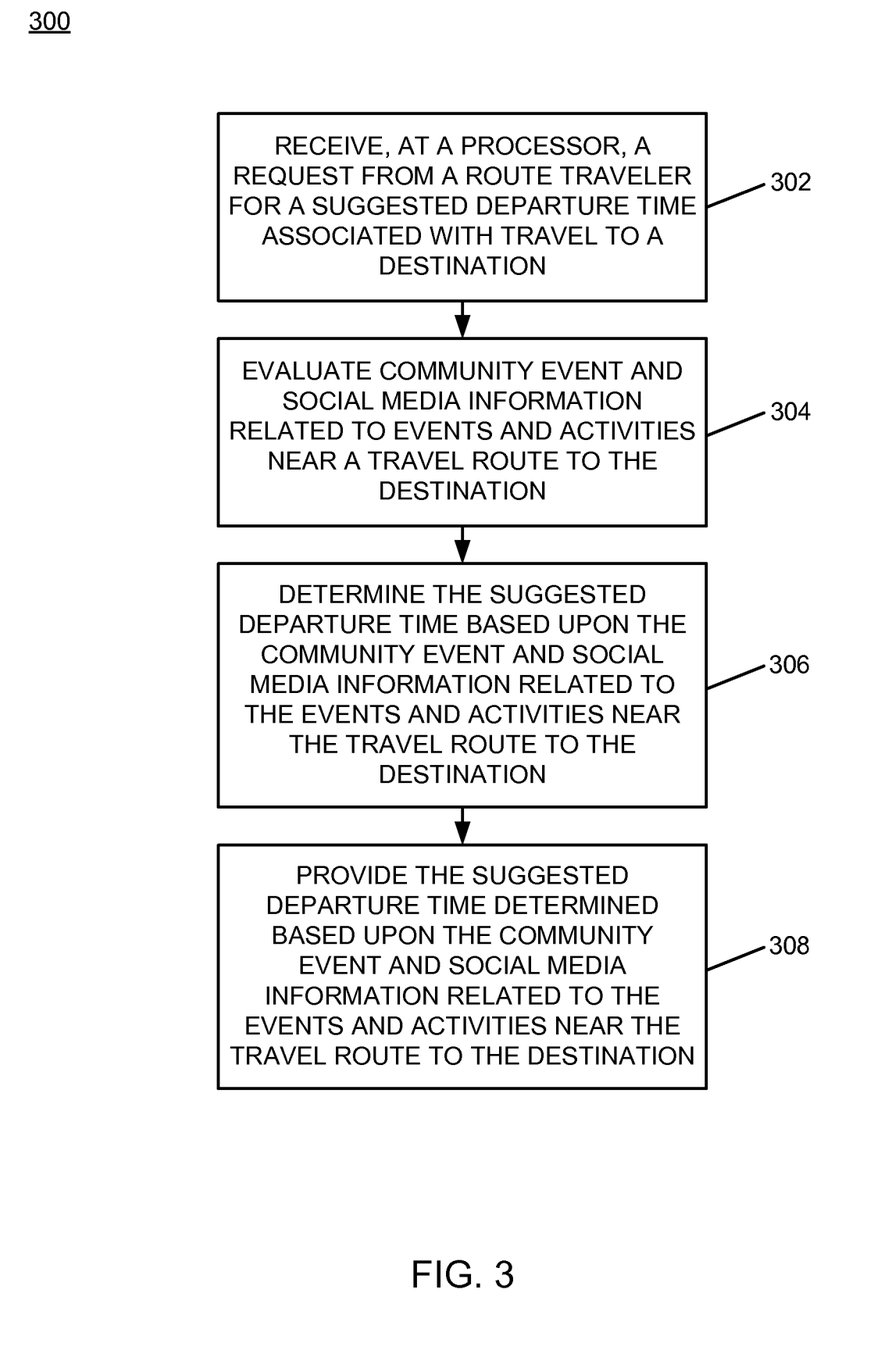
FIG. 3 is a flow chart of an example of an implementation of a process for travel departure time determination using social media and regional event information according to an embodiment of the present subject matter.
Figure 4:
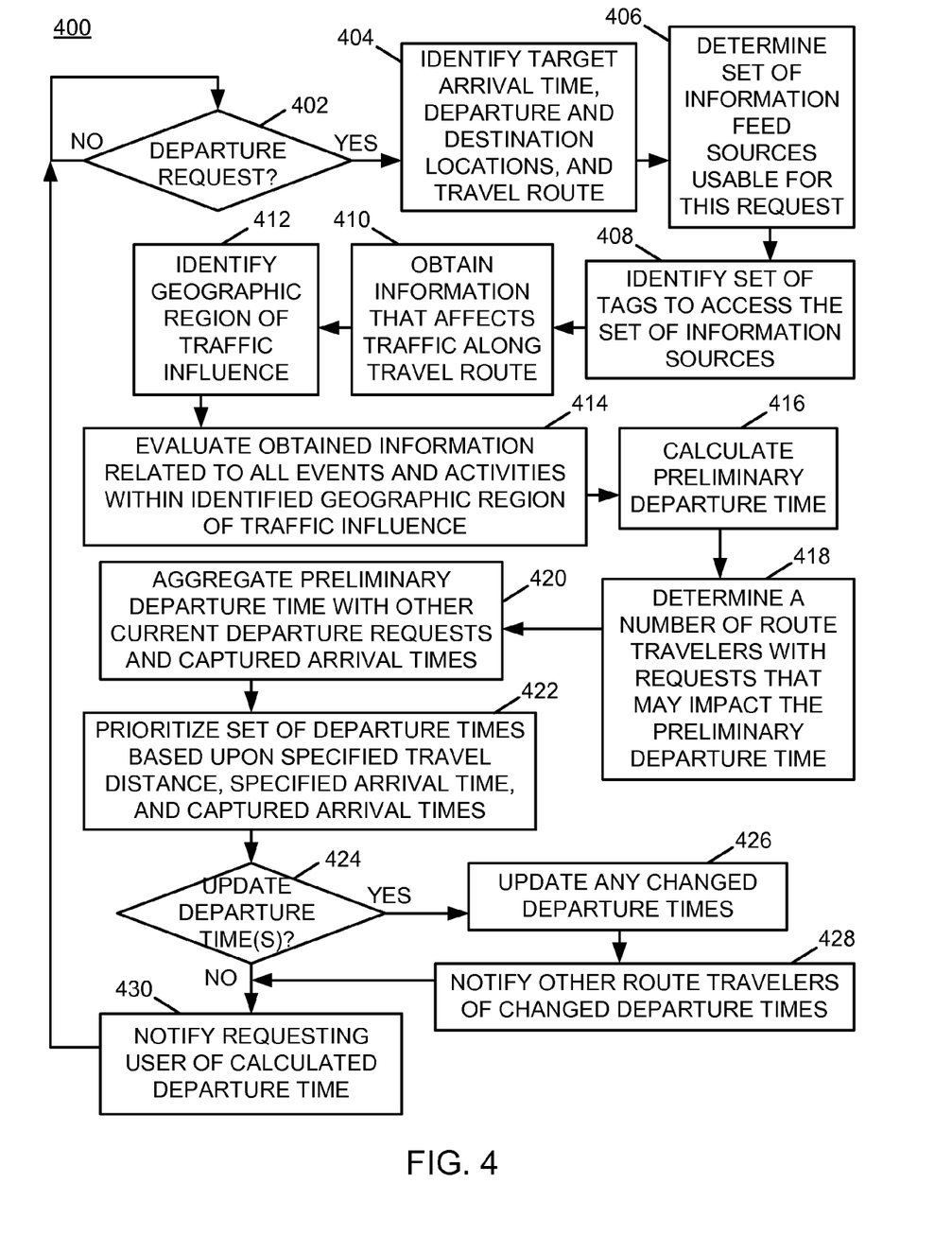
FIG. 4 is a flow chart of an example of an implementation of a process for travel departure time determination using social media and regional event information according to an embodiment of the present subject matter.

FIG. 3 through FIG. 4 described below represent example processes that may be executed by devices, such as the core processing module 200, to perform the automated travel departure time determination using social media and regional event information associated with the present subject matter. Many other variations on the example processes are possible and all are considered within the scope of the present subject matter. The example processes may be performed by modules, such as the vehicle departure time adjustment processing module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for travel departure time determination using social media and regional event information. At block 302, the process 300 receives, at a processor, a request from a route traveler for a suggested departure time associated with travel to a destination. At block 304, the process 300 evaluates community event and social media information related to events and activities near a travel route to the destination. At block 306, the process 300 determines the suggested departure time based upon the community event and social media information related to the events and activities near the travel route to the destination. At block 308, the process 300 provides the suggested departure time determined based upon the community event and social media information related to the events and activities near the travel route to the destination.

FIG. 4 is a flow chart of an example of an implementation of a process 400 for travel departure time determination using social media and regional event information. At decision point 402, the process 400 makes a determination as to whether a departure request has been received/detected from a user. As described above, multiple users may issue requests for departure times. As such, the process 400 may be considered reentrant, iterative, or otherwise configured to process multiple departure requests concurrently to aggregate the respective requests.

In response to determining at decision point 402 that a departure request has been received/detected from a user, the process 400 identifies the target arrival time, a departure and destination location, and a travel route at block 404. The target arrival time, and the departure and destination location may be determined from the departure request as specified by the user. The travel route may be calculated from mapping or other information sources and services, as appropriate for a given implementation. The departure request may also include other information as appropriate for the given implementation.

At block 406, the process 400 determines a set of information feed sources usable to evaluate the departure request. As described above, the respective set of information feed sources usable to evaluate the departure request may be derived from social media and regional event information feed services, traffic feed services, weather feed services, and other information sources, as appropriate for the given implementation. It should be noted that the respective feeds are web feeds, such as web feeds provided by really simple syndication (RSS) feed sources or other data/information feed sources.

At block 408, the process 400 identifies a set of tags usable to access the identified set of information sources. At block 410, the process 400 obtains information that affects traffic along the identified travel route from the determined set of information feed sources usable to evaluate the departure request using the identified set of tags. At block 412, the process 400 identifies a geographic region of traffic influence that affects a travel route to the destination. As described above, the respective geographic region of traffic influence may be identified/derived from social media and regional event information, traffic services, weather, and other information sources.

Several options of identifying the geographic region of traffic influence exist. For example, the process 400 may determine a distance along a travel route from the departure location to the destination location. The process 400 may identify a region of traffic influence peripheral to the travel route based upon the determined distance. The region of traffic influence peripheral to the travel route may increase in proportion to increases in the determined distance along the travel route to the destination location.

The process 400 may alternatively/additionally identify a geographic circular region of traffic influence with a circumference bounded by a radius equivalent to the determined distance along the travel route to the destination location that emanates from the destination. The process 400 may, as another alternative, identify multiple geographic circular regions of traffic influence. Each of the multiple geographic circular regions of traffic influence may emanate from a point or intersection along the travel route to the destination. Further, each of the multiple geographic circular regions of traffic influence may include a circumference bounded by a radius equivalent to a distance from the respective point/intersection to a subsequent point/intersection along the travel route to the destination.

At block 414, the process 400 evaluates the obtained information related to all events and activities within the identified geographic regions of traffic influence. For example, the process 400 may evaluate community event and social media information related to all events and activities within the identified region of traffic influence. At block 416, the process 400 calculates a preliminary departure time for the departure request.

As described above, the process 400 may process multiple departure requests concurrently using technology as appropriate for the given implementation. As such, at block 418, the process determines a number of route travelers with departure requests that may impact preliminary departure times. The determination may include contemporaneous requests and previously-processed departure requests that are still active based upon the respective route requesters still being in transit along their respective travel routes.

At block 420, the process 400 aggregates the preliminary departure time with the other current departure requests and any captured arrival times. As described above, subscribing users may "check in" upon arrival at their respective destinations. This check-in information may be used to adjust/update any other outstanding suggested arrival times and to refine the processing for determinations of suggested departure times over time.

At block 422, the process 400 prioritizes the suggested departure times based upon the specified arrival time and travel distance associated with each of the departure requests and any captured arrival times of other route travelers. As such, any captured arrival times of other route travelers may be combined with the community event and social media information related to events and activities near the travel route to the destination. Accordingly, any captured arrival times may be used to assist with prioritization of remaining/current departure times, including the calculated preliminary departure time.

Additionally, as described above, suggested departure times may also be time-distributed to mitigate the traffic impact of each of multiple route travelers. For example, the prioritization of suggested departure times may suggest earlier departure times to travelers with shorter travel routes to allow these parties to complete their travel and alleviate roadway congestion for route travelers with longer travel routes. As such, traffic conditions may be improved for multiple route travelers by prioritizing the respective suggested departure times based upon specified arrival times associated with each of the departure requests associated with travel to the respective destinations.

At decision point 424, the process 400 determines whether to update any of the outstanding suggested departure times (including the one or more calculated preliminary departure times). In response to determining to update at least one of the outstanding suggested departure times, the process 400 updates any changed departure times at block 426. The process 400 may, for example, determine one or more updated suggested departure times based upon captured arrival times of the other route travelers combined with the community event and social media information related to events and activities near the travel route to the destination.

At block 428, the process 400 notifies any other route travelers of any changes to their respective changed departure times. As such, the process 400 may provide the updated suggested departure time based upon the combination of the captured arrival times of multiple route travelers with the community event and social media information related to events and activities near the travel route to the destination.

In response to notifying any other route travelers of any changes to their respective changed departure times at block 428, or in response to determining not to update at least one of the outstanding suggested departure times at decision point 424, the process 400 notifies the requesting user of the calculated departure time (note that this suggested departure time is no longer preliminary). As such, the process 400 provides the suggested departure time determined based upon the combination of the community event and social media information related to the events and activities near the travel route to the destination with captured arrival times of other route travelers. The process 400 returns to decision point 402 to await a new departure time request and iterates as described above.

As such, the process 400 receives and responds to multiple requests for a suggested departure time associated with travel to one or more destinations from multiple route travelers. The process 400 evaluates community event and social media information related to events and activities near a travel route to the respective destination, and aggregates the impact of all outstanding travel requests based upon the evaluated community event and social media information. The process 400 determines and suggests departure times that are time-distributed to mitigate the traffic impact of each of multiple route travelers to the respective destinations. The process 400 iteratively captures arrival times of multiple route travelers relative to previously-suggested departure times for the multiple route travelers, and combines the captured arrival times of the multiple route travelers with the community event and social media information related to events and activities near the travel route to the destination. The process 400 further adjusts each of multiple suggested departure times such that route travelers that have a shorter travel time are suggested to leave earlier than route travelers that have longer travel time. The process 400 determines and provides the updated suggested departure time(s) based upon the combination of the captured arrival times of the multiple route travelers with the community event and social media information related to events and activities near the travel route to the destination.

As described above in association with FIG. 1 through FIG. 4, the example systems and processes provide travel departure time determination using social media and regional event information. Many other variations and additional activities associated with travel departure time determination using social media and regional event information are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, at a processor, a request from a route traveler for a suggested departure time associated with travel to a destination;
    evaluating community event and social media information related to events and activities near a travel route to the destination;
    determining the suggested departure time based upon the community event and social media information related to the events and activities near the travel route to the destination;
    providing the suggested departure time determined based upon the community event and social media information related to the events and activities near the travel route to the destination;
    iteratively capturing arrival times of a plurality of route travelers relative to previously-suggested departure times for the plurality of route travelers;
    combining the captured arrival times of the plurality of route travelers with the community event and social media information related to the events and activities near the travel route to the destination;
    determining an updated suggested departure time based upon the combination of the captured arrival times of the plurality of route travelers with the community event and social media information related to the events and activities near the travel route to the destination; and
    providing the updated suggested departure time based upon the combination of the captured arrival times of the plurality of route travelers with the community event and social media information related to the events and activities near the travel route to the destination.

2. The method of claim 1, where:
    receiving, at the processor, the request from the route traveler for the suggested departure time associated with travel to the destination comprises receiving a plurality of requests from the plurality of route travelers for suggested departure times associated with travel to a plurality of destinations; and
    determining the suggested departure time based upon the community event and social media information related to the events and activities near the travel route to the destination comprises determining time-distributed suggested departure times that mitigate a traffic impact of each of the plurality of route travelers to the plurality of destinations.

3. The method of claim 2, where determining the time-distributed suggested departure times that mitigate the traffic impact of each of the plurality of route travelers to the plurality of destinations comprises adjusting each of the time-distributed suggested departure times such that route travelers that have a shorter travel time are suggested to leave earlier than route travelers that have longer travel time.

4. The method of claim 1, where:
    receiving, at the processor, the request from the route traveler for the suggested departure time associated with travel to the destination comprises receiving a plurality of requests from the plurality of route travelers for suggested departure times associated with travel to a plurality of destinations; and
    determining the suggested departure time based upon the community event and social media information related to the events and activities near the travel route to the destination comprises:
        determining a number of the plurality of route travelers that are requesting the plurality of requests for the suggested departure times; and
        prioritizing the suggested departure times based upon specified arrival times associated with each of the plurality of requests for the suggested departure times.

5. The method of claim 1, where evaluating the community event and social media information related to the events and activities near the travel route to the destination comprises:

determining a distance along the travel route to the destination;

identifying a region of traffic influence peripheral to the travel route based upon the determined distance, where the region of traffic influence peripheral to the travel route increases proportionally to increases in the determined distance along the travel route to the destination; and evaluating community event and social media information related to all events and activities within the identified region of traffic influence.

6. The method of claim 5, where identifying the region of traffic influence peripheral to the travel route based upon the determined distance comprises identifying a geographic circular region of traffic influence with a circumference bounded by a radius equivalent to the determined distance along the travel route to the destination that emanates from the destination.

7. A system, comprising:
a memory; and
a processor programmed to:
   receive a request from a route traveler for a suggested departure time associated with travel to a destination;
   evaluate community event and social media information obtained from the memory related to events and activities near a travel route to the destination;
   determine the suggested departure time based upon the community event and social media information related to the events and activities near the travel route to the destination;
   provide the suggested departure time determined based upon the community event and social media information related to the events and activities near the travel route to the destination;
   iteratively capture arrival times of a plurality of route travelers relative to previously-suggested departure times for the plurality of route travelers;
   combine the captured arrival times of the plurality of route travelers with the community event and social media information related to the events and activities near the travel route to the destination;
   determine an updated suggested departure time based upon the combination of the captured arrival times of the plurality of route travelers with the community event and social media information related to the events and activities near the travel route to the destination; and
   provide the updated suggested departure time based upon the combination of the captured arrival times of the plurality of route travelers with the community event and social media information related to the events and activities near the travel route to the destination.

8. The system of claim 7, where, in being programmed to:
receive the request from the route traveler for the suggested departure time associated with travel to the destination, the processor is programmed to receive a plurality of requests from the plurality of route travelers for suggested departure times associated with travel to a plurality of destinations; and
determine the suggested departure time based upon the community event and social media information related to the events and activities near the travel route to the destination, the processor is programmed to determine time-distributed suggested departure times that mitigate a traffic impact of each of the plurality of route travelers to the plurality of destinations.

9. The system of claim 8, where, in being programmed to determine the time-distributed suggested departure times that mitigate the traffic impact of each of the plurality of route travelers to the plurality of destinations, the processor is programmed to adjust each of the time-distributed suggested departure times such that route travelers that have a shorter travel time are suggested to leave earlier than route travelers that have longer travel time.

10. The system of claim 7, where, in being programmed to:
receive the request from the route traveler for the suggested departure time associated with travel to the destination, the processor is programmed to receive a plurality of requests from the plurality of route travelers for suggested departure times associated with travel to a plurality of destinations; and
determine the suggested departure time based upon the community event and social media information related to the events and activities near the travel route to the destination, the processor is programmed to:
   determine a number of the plurality of route travelers that are requesting the plurality of requests for the suggested departure times; and
   prioritize the suggested departure times based upon specified arrival times associated with each of the plurality of requests for the suggested departure times.

11. The system of claim 7, where, in being programmed to evaluate the community event and social media information obtained from the memory related to the events and activities near the travel route to the destination, the processor is programmed to:
   determine a distance along the travel route to the destination;
   identify a region of traffic influence peripheral to the travel route based upon the determined distance, where the region of traffic influence peripheral to the travel route increases proportionally to increases in the determined distance along the travel route to the destination; and
   evaluate community event and social media information obtained from the memory related to all events and activities within the identified region of traffic influence.

12. A computer program product, comprising:
a non-transitory computer readable storage medium having computer readable program code embodied therewith, where the computer readable program code when executed on a computer causes the computer to:
   receive a request from a route traveler for a suggested departure time associated with travel to a destination;
   evaluate community event and social media information related to events and activities near a travel route to the destination;
   determine the suggested departure time based upon the community event and social media information related to the events and activities near the travel route to the destination;
   provide the suggested departure time determined based upon the community event and social media information related to the events and activities near the travel route to the destination;
   iteratively capture arrival times of a plurality of route travelers relative to previously-suggested departure times for the plurality of route travelers;
   combine the captured arrival times of the plurality of route travelers with the community event and social media information related to the events and activities near the travel route to the destination;

determine an updated suggested departure time based upon the combination of the captured arrival times of the plurality of route travelers with the community event and social media information related to the events and activities near the travel route to the destination; and provide the updated suggested departure time based upon the combination of the captured arrival times of the plurality of route travelers with the community event and social media information related to the events and activities near the travel route to the destination.

13. The computer program product of claim 12, where, in causing the computer to:

receive the request from the route traveler for the suggested departure time associated with travel to the destination, the computer readable program code when executed on the computer causes the computer to receive a plurality of requests from the plurality of route travelers for suggested departure times associated with travel to a plurality of destinations; and determine the suggested departure time based upon the community event and social media information related to the events and activities near the travel route to the destination, the computer readable program code when executed on the computer causes the computer to determine time-distributed suggested departure times that mitigate a traffic impact of each of the plurality of route travelers to the plurality of destinations.

14. The computer program product of claim 13, where, in causing the computer to determine the time-distributed suggested departure times that mitigate the traffic impact of each of the plurality of route travelers to the plurality of destinations, the computer readable program code when executed on the computer causes the computer to adjust each of the time-distributed suggested departure times such that route travelers that have a shorter travel time are suggested to leave earlier than route travelers that have longer travel time.

15. The computer program product of claim 12, where, in causing the computer to:

receive the request from the route traveler for the suggested departure time associated with travel to the destination, the computer readable program code when executed on the computer causes the computer to receive a plurality of requests from the plurality of route travelers for suggested departure times associated with travel to a plurality of destinations; and determine the suggested departure time based upon the community event and social media information related to the events and activities near the travel route to the destination, the computer readable program code when executed on the computer causes the computer to:

determine a number of the plurality of route travelers that are requesting the plurality of requests for the suggested departure times; and prioritize the suggested departure times based upon specified arrival times associated with each of the plurality of requests for the suggested departure times.

16. The computer program product of claim 12, where, in causing the computer to evaluate the community event and social media information related to the events and activities near the travel route to the destination, the computer readable program code when executed on the computer causes the computer to:

determine a distance along the travel route to the destination;

identify a region of traffic influence peripheral to the travel route based upon the determined distance, where the region of traffic influence peripheral to the travel route increases proportionally to increases in the determined distance along the travel route to the destination; and evaluate community event and social media information related to all events and activities within the identified region of traffic influence.

17. The computer program product of claim 16, where, in causing the computer to identify the region of traffic influence peripheral to the travel route based upon the determined distance, the computer readable program code when executed on the computer causes the computer to identify a geographic circular region of traffic influence with a circumference bounded by a radius equivalent to the determined distance along the travel route to the destination that emanates from the destination.

* * * * *